United States Patent
Ida et al.

(10) Patent No.: US 11,689,702 B2
(45) Date of Patent: Jun. 27, 2023

(54) INFORMATION PROCESSING APPARATUS AND INFORMATION PROCESSING METHOD

(71) Applicant: SONY CORPORATION, Tokyo (JP)

(72) Inventors: Kentaro Ida, Tokyo (JP); Yu Aoki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,692

(22) PCT Filed: Aug. 2, 2019

(86) PCT No.: PCT/JP2019/030465
§ 371 (c)(1),
(2) Date: Feb. 19, 2021

(87) PCT Pub. No.: WO2020/044950
PCT Pub. Date: Mar. 5, 2020

(65) Prior Publication Data
US 2021/0329205 A1     Oct. 21, 2021

(30) Foreign Application Priority Data
Aug. 30, 2018   (JP) ................................. 2018-161822

(51) Int. Cl.
*H04N 9/31* (2006.01)
*G06F 3/03* (2006.01)

(52) U.S. Cl.
CPC ......... *H04N 9/3185* (2013.01); *G06F 3/0304* (2013.01); *H04N 9/3194* (2013.01)

(58) Field of Classification Search
CPC .............. H04N 9/3185; H04N 9/3194; H04N 21/4122; H04N 21/42222;
(Continued)

(56) References Cited

U.S. PATENT DOCUMENTS

| 2004/0036813 | A1  | 2/2004 | Matsuda |
| 2008/0024684 | A1* | 1/2008 | Park ........................ H04N 5/74 348/E3.04 |

(Continued)

FOREIGN PATENT DOCUMENTS

| EP | 1365597 A2    | 11/2003 |
| JP | 2001-174915 A | 6/2001  |

(Continued)

OTHER PUBLICATIONS

International Search Report and Written Opinion of PCT Application No. PCT/JP2019/030465 dated Oct. 21, 2019, 09 pages of ISRWO.

*Primary Examiner* — John W Miller
*Assistant Examiner* — Humam M Satti
(74) *Attorney, Agent, or Firm* — Chip Law Group

(57) ABSTRACT

An information processing apparatus includes an input unit and a control unit. The input unit to which sensing information and coordinate information are input, the sensing information being obtained by sensing a space in which video is projected, the coordinate information being obtained by pointing through a pointing operation of the space by a user. The control unit stores setting information for setting a projection region in a predetermined range in a storage unit on the basis of a result of analyzing a state in the space on the basis of the sensing information and the coordinate information. Then, the control unit controls, in a case where a projection region is designated by the user on the basis of the stored setting information, a projection apparatus to project the video onto the projection region.

10 Claims, 13 Drawing Sheets

(58) Field of Classification Search
CPC ............ H04N 21/44213; G06F 3/0304; G06F 3/03547; G06F 3/0425; G06F 3/033; G01V 8/00; G03B 21/14; G09G 5/00; G09G 5/36; G09G 5/38
See application file for complete search history.

(56) References Cited

U.S. PATENT DOCUMENTS

| | | | |
|---|---|---|---|
| 2009/0027629 A1* | 1/2009 | Yonezawa | H04N 21/4122 353/70 |
| 2009/0207323 A1* | 8/2009 | Tamura | G03B 21/005 348/745 |
| 2010/0103330 A1* | 4/2010 | Morrison | H04N 9/3185 353/121 |
| 2011/0032492 A1* | 2/2011 | Nara | H04N 9/3194 353/70 |
| 2012/0105816 A1* | 5/2012 | Ozawa | G06F 3/04842 353/85 |
| 2013/0257702 A1 | 10/2013 | Ozeki | |
| 2015/0061884 A1* | 3/2015 | Hwang | H04N 21/4782 340/815.45 |
| 2015/0095953 A1* | 4/2015 | Cheon | H04N 21/482 725/53 |
| 2018/0024696 A1 | 1/2018 | Lee et al. | |
| 2018/0061372 A1* | 3/2018 | Ano | G06F 3/1423 |

FOREIGN PATENT DOCUMENTS

| | | |
|---|---|---|
| JP | 2004-048694 A | 2/2004 |
| JP | 2006-121312 A | 5/2006 |
| JP | 2007-036482 A | 2/2007 |
| JP | 2007-516645 A | 6/2007 |
| JP | 2013-207615 A | 10/2013 |
| JP | 2013-258555 A | 12/2013 |
| JP | 2014-095891 A | 5/2014 |
| JP | 2015-145894 A | 8/2015 |
| KR | 10-2016-0095923 A | 8/2016 |
| KR | 10-2016-0136963 A | 11/2016 |
| WO | 2004/104766 A2 | 12/2004 |
| WO | 2016/125966 A1 | 8/2016 |

* cited by examiner

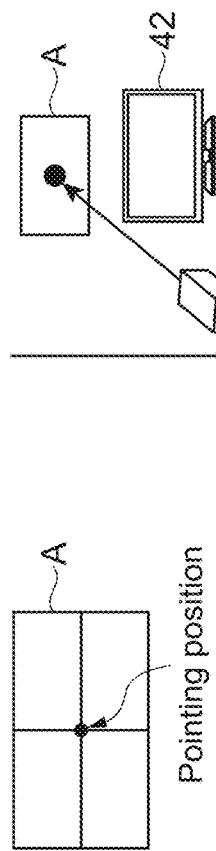
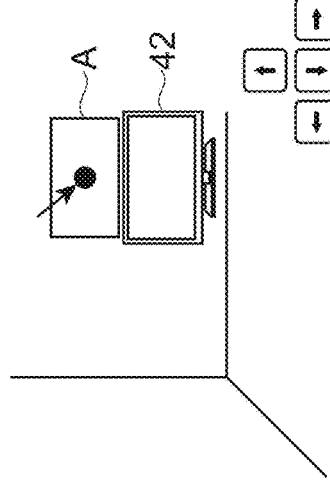
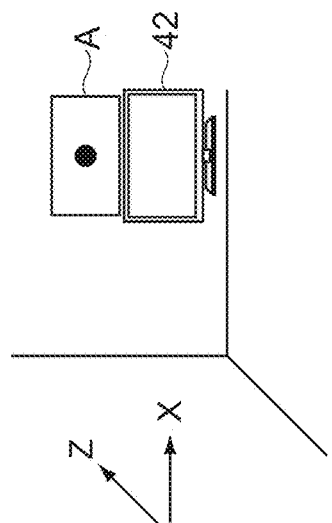
FIG. 5A  Roughly select display place through pointing device
FIG. 5B  Finely adjust display place through d-pad
FIG. 5C  Name preset place
Data format
[Preset name] : Display center coordinates(X, Y, Z)
: Display size(X, Y)
Example of left picture)
"Above TV" : (100, 200, 100) : (160, 90)

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/030465 filed on Aug. 2, 2019, which claims priority benefit of Japanese Patent Application No. JP 2018-161822 filed in the Japan Patent Office on Aug. 30, 2018. Each of the above-referenced applications is hereby incorporated herein by reference in its entirety.

TECHNICAL FIELD

The present technology relates to an information processing apparatus, an information processing method, and a program that are capable of controlling a driving projector capable of changing a projection region.

BACKGROUND ART

Conventionally, a projector capable of changing a projection region has been developed. Patent Literature 1 has disclosed an information processing apparatus capable of switching between a display control mode on which a position or a shape of a projection region is changed on the basis of a pointing operation of a user and an execution mode on which processing corresponding to a display object in the projection region is executed on the basis of such an operation.

CITATION LIST

Patent Literature

Patent Literature 1: Japanese Patent Application Laid-open No. 2013-258555

DISCLOSURE OF INVENTION

Technical Problem

However, in the technology described in Patent Literature 1, in a case where the user wishes to change the projection region, the user needs to call the display control mode every time and position the changed projection region.

In view of the above-mentioned circumstances, it is an object of the present technology to provide an information processing apparatus, an information processing method, and a program that are capable of setting a projection region for video at various positions desired by a user and easily projecting the video on the projection region.

Solution to Problem

In order to accomplish the above-mentioned object, an information processing apparatus according to an embodiment of the present technology includes an input unit and a control unit. The input unit to which sensing information and coordinate information are input, the sensing information being obtained by sensing a space in which video is projected, the coordinate information being obtained by pointing through a pointing operation of the space by a user. The control unit stores setting information for setting a projection region in a predetermined range in a storage unit on the basis of a result of analyzing a state in the space on the basis of the sensing information and the coordinate information. Then, the control unit controls, in a case where a projection region is designated by the user on the basis of the stored setting information, a projection apparatus to project the video onto the projection region.

With this configuration, the information processing apparatus can set the projection region at various positions desired by the user on the basis of the user's pointing operation and easily project the video in the projection region. Here, the projection apparatus may be externally connected to the information processing apparatus or may be configured integrally with the information processing apparatus. The sensing information is, for example, information obtained by a depth sensor, an illuminance sensor, or the like.

The control unit may set the projection region to be centered on coordinates changed from coordinates indicated by the coordinate information on the basis of the result of analyzing.

Accordingly, the information processing apparatus can change and set the projection region to more appropriate coordinates in a case where it is recognized that the space of the coordinates pointed by the user is inappropriate for projection.

The control unit may set the projection region along an edge of an object recognized in vicinity of the coordinates indicated by the coordinate information.

Accordingly, the information processing apparatus can set the projection region along the edge to thereby enable for the user to easily remember the projection region and also enable the visibility at the time of projection to be improved.

The control unit may set, in a case where a plurality of edges is detected within a distance that is a predetermined radius from the coordinates indicated by the coordinate information, the projection region along one of the edges that minimizes a movement distance when the coordinates are moved along the edge.

Accordingly, the information processing apparatus can set the projection region along an edge of the plurality of edges, which is as close as possible to a position originally desired by the user.

The control unit may change an area of the projection region set in accordance with an area of a plane including the coordinates indicated by the coordinate information.

Accordingly, the information processing apparatus can set the projection region to have a maximum area in accordance with the area of the plane that is a target of the pointing operation.

The control unit may output, in a case of determining that a surface in vicinity of the coordinates indicated by the coordinate information is inappropriate for projection by the analysis, information for prompting to perform the pointing operation on coordinates different from the coordinates anew.

Accordingly, when the user points to a position inappropriate for projection, the information processing apparatus can prompt to set the projection region avoiding that position.

The control unit may determine that the projection region is designated in a case where the pointing operation by the user is received in an extended region including the set projection region and extended to be larger than the projection region.

Accordingly, the user can intuitively and easily designate the projection region without exactly adjusting a pointing position. The extended region may be varied in a manner that depends on the distance between the user and the projection region.

The control unit may handle, in a case where an overlap region between the extended regions of the plurality of projection regions set is present, the pointing operation with respect to the overlap region as an invalid operation.

Accordingly, with the information processing apparatus, it can be prevented that it is impossible to determine which of the plurality of projection regions set at close positions has been designated by the user.

The control unit may output, in a case where the pointing operation is detected outside the extended region or inside the overlap region, feedback information for providing a feedback indicating that that the pointing operation is invalid to the user.

Accordingly, the information processing apparatus enables the user to know that the pointing operation is invalid and can prompt to perform the pointing operation anew at a position different for designating the projection region. Here, the feedback information may be output from the projection apparatus as image information and may be output from a PC or external speaker as audio information.

The control unit may store the setting information together with identification information for identifying the projection region and determine that a projection region corresponding to the identification information is designated when an operation or voice to select the identification information is input from the user.

Accordingly, the information processing apparatus can select the projection region on the basis of not only the user's pointing operation but also selection of identification information.

An information processing method according to another embodiment of the present technology includes:
  receiving input of sensing information and coordinate information, the sensing information being obtained by sensing a space in which video is projected, the coordinate information being obtained by pointing through a pointing operation of the space by a user;
  storing setting information for setting a projection region in a predetermined range on the basis of a result of analyzing a state in the space on the basis of the sensing information and the coordinate information; and
  controlling, in a case where a projection region is designated by the user on the basis of the stored setting information, a projection apparatus to project the video onto the projection region.

A program according to another embodiment of the present technology causes an information processing apparatus to execute the steps of:
  receiving input of sensing information and coordinate information, the sensing information being obtained by sensing a space in which video is projected, the coordinate information being obtained by pointing through a pointing operation of the space by a user;
  storing setting information for setting a projection region in a predetermined range on the basis of a result of analyzing a state in the space on the basis of the sensing information and the coordinate information; and
  controlling, in a case where a projection region is designated by the user on the basis of the stored setting information, a projection apparatus to project the video onto the projection region.

Advantageous Effects of Invention

As described above, in accordance with the present technology, it is possible to set a projection region for video at various positions desired by a user and easily project the video on the projection region. However, this effect does not limit the present technology.

BRIEF DESCRIPTION OF DRAWINGS

FIGS. 5A, 5B, and 5C Diagrams showing a flow of fine adjustment processing of the projection region present in the video projection system.

MODE(S) FOR CARRYING OUT THE INVENTION

Hereinafter, embodiments according to the present technology will be described with reference to the drawings.

Overview of System

Figure 1:
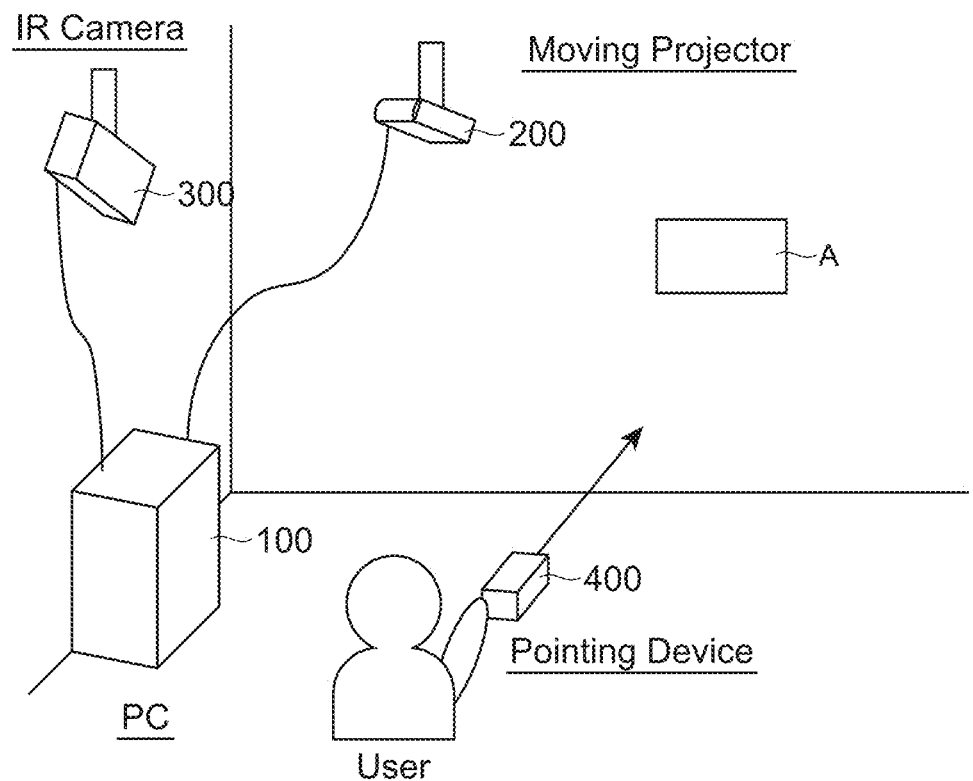
FIG. 1 A diagram showing a configuration of a video projection system according to an embodiment of the present technology.

FIG. 1 is a diagram showing a configuration of a video projection system according to an embodiment of the present technology.

As shown in the figure, this system includes a PC 100, a moving projector 200, an infrared (IR) camera 300, and a pointing device 400. These are present in the same space, for example, in a house or the like.

The PC 100 is connected to the moving projector 200 and the IR camera.

The moving projector 200 projects video on a projection region A set on a wall surface or the like in the space.

The pointing device 400 emits IR light on the basis of a user's operation. The IR camera 300 detects IR light reflected on the wall surface or the like.

The PC 100 directs the projection center of the moving projector 200 with respect to coordinates detected by a pointing operation by the pointing device 400 and performs geometric correction of the projected video (projection region A) in accordance with a tilt of the wall surface in the direction.

In this embodiment, the PC 100 has a function of storing a preset position of the projection region A in view of a state of the space (hereinafter, also referred to as preset function) and a function of calling the preset projection region (hereinafter, also referred to as call function) on the basis of the user's pointing operation.

Hardware Configuration of PC

Figure 2:
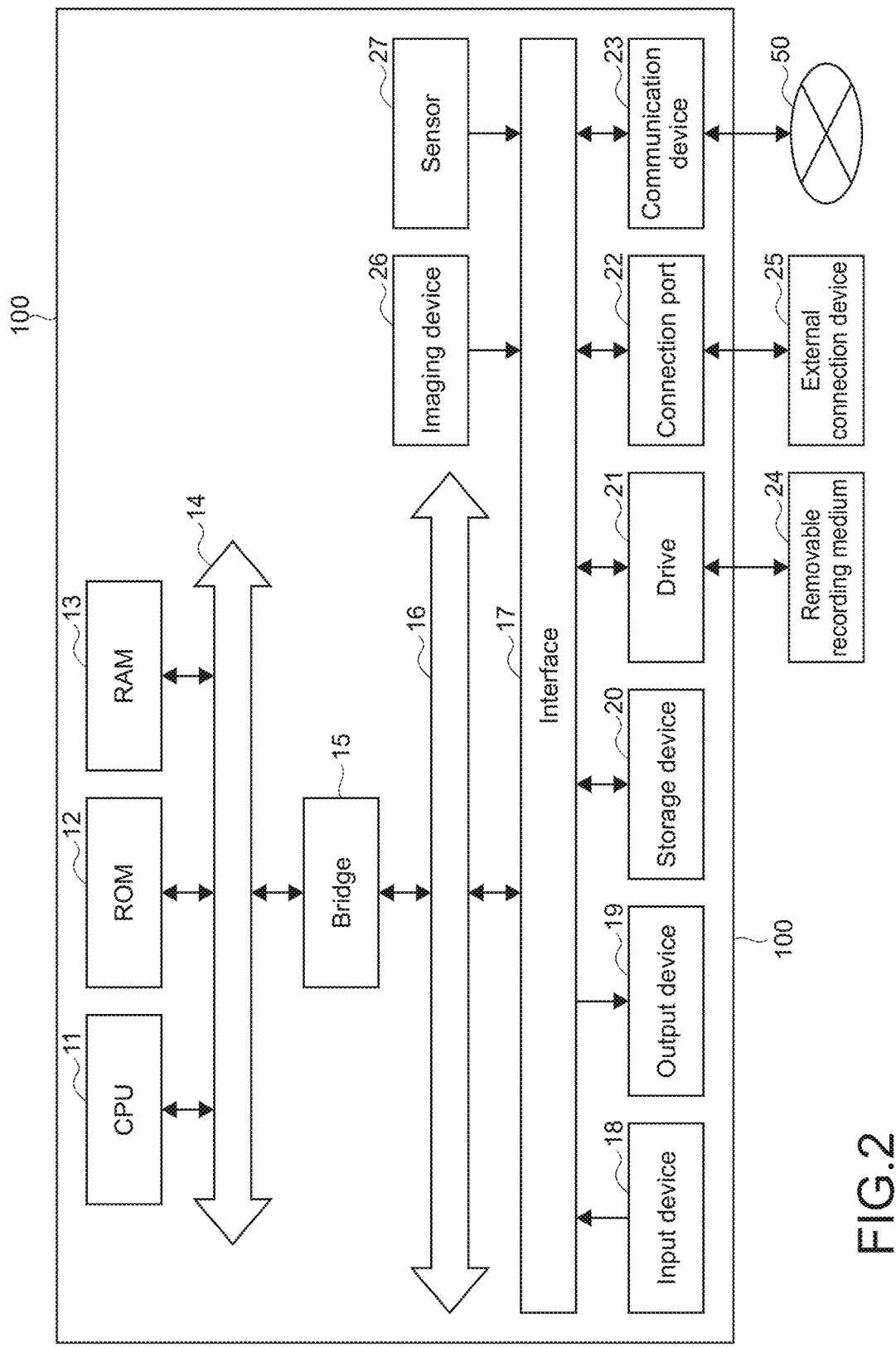
FIG. 2 A diagram showing a hardware configuration of a PC of the video projection system.

FIG. 2 is a diagram showing a hardware configuration of the above-mentioned PC 100.

As shown in the figure, the PC 100 includes a central processing unit (CPU) 11, a read only memory (ROM) 12, and a random access memory (RAM) 13. Moreover, the PC 100 may include a host bus 14, a bridge 15, an external bus 16, an interface 17, an input device 18, an output device 19, a storage device 20, a drive 21, a connection port 22, and a communication device 23. Moreover, the PC 100 may optionally include an imaging device 26 and a sensor 27. The PC 100 may include processing circuits such as a digital signal processor (DSP), an application specific integrated circuit (ASIC), and a field-programmable gate array (FPGA) instead of or in addition to the CPU 11.

The CPU 11 functions as an arithmetic processing device and a control device and controls general operations in the PC 100 or some of them in accordance with various programs recorded on the ROM 12, the RAM 13, the storage device 20, or a removable recording medium 24. The ROM 12 stores programs and arithmetic parameters used by the CPU 11. The RAM 13 temporarily stores a program used in running of the CPU 11, parameters that change accordingly in the running, and the like. The CPU 11, the ROM 12, and the RAM 13 are interconnected by the host bus 14 including an internal bus such as a CPU bus. Moreover, the host bus 14 is connected to the external bus 16 such as a peripheral component interconnect/interface (PCI) bus via the bridge 15.

The input device 18 is a device operated by the user, such as a touch panel, a physical button, a switch, and a lever, for example. The input device 18 may be, for example, a remote control device using infrared rays or other radio waves or may be an external connection device 25 such as a smartphone and a smartwatch adaptable for an operation of the PC 100. The input device 18 includes an input control circuit that generates an input signal on the basis of information input by the user and outputs the generated input signal to the CPU 11. By operating the input device 18, the user inputs various types of data to the PC 100 or instructs a processing operation.

The output device 19 is configured as a device capable of notifying the user of obtained information by using a sense such as a sense of sight, a sense of hearing, a sense of touch. The output device 19 can be, for example, a display device such as a liquid-crystal display (LCD) or an organic electroluminescence (EL) display, an audio output device such as a speaker, or the like. The output device 19 outputs a result obtained by the PC 100 as video such as a text and an image, audio such as voice and sound, vibration, or the like.

The storage device 20 is a data storage device configured as an example of the storage unit of the PC 100. The storage device 20 includes, for example, a magnetic storage device such as a hard disk drive (HDD), a semiconductor storage device, an optical storage device, a magneto-optical storage device, and the like. The storage device 20 stores, for example, a program and various types of data executed by the CPU 11, various types of data obtained from the outside, and preset information of the projection region A.

The drive 21 is a reader/writer for the removable recording medium 24 such as a magnetic disk, an optical disc, a magneto-optical disc, and a semiconductor memory, and is built in or externally attached to the PC 100. The drive 21 reads out the information recorded in the mounted removable recording medium 24 and outputs the read-out information to the RAM 13. Moreover, the drive 21 writes a record in the mounted removable recording medium 24.

The connection port 22 is a port for connecting the device to the PC 100. The connection port 22 may be, for example, a universal serial bus (USB) port, an IEEE1394 port, a small computer system interface (SCSI) port, or the like. Alternatively, the connection port 22 may be an RS-232C port, an optical audio terminal, a high-definition multimedia interface (HDMI) (registered trademark) port, or the like. By connecting the external connection device 25 to the connection port 22, various types of data can be exchanged between the PC 100 and the external connection device 25.

The communication device 23 is, for example, a communication interface including a communication device and the like for connecting to a communication network 50. The communication device 23 can be, for example, a communication card for a local region network (LAN), Bluetooth (registered trademark), Wi-Fi, or a wireless USB (WUSB) or the like. Alternatively, the communication device 23 may be a router for optical communication, a router for an asymmetric digital subscriber line (ADSL), a modem for various types of communication, or the like. The communication device 23 sends and receives a signal and the like to and from the Internet or other communication devices by using a predetermined protocol such as TCP/IP. Moreover, the communication network 50 connected to the communication device 23 is a network connected thereto with a wire or wirelessly and can include, for example, the Internet, a home LAN, infrared communication, radio wave communication, satellite communication, and the like.

The imaging device 26 is, for example, a camera for imaging a real space and generating a captured image by using various members such as an image pickup device such as a complementary metal oxide semiconductor (CMOS) or a charge coupled device (CCD) and a lens for controlling forming of an object image in the image pickup device. The imaging device 26 may take a still image or may take a moving image.

The sensor 27 is various sensors such as an acceleration sensor, an angular velocity sensor, a geomagnetic sensor, an illuminance sensor, a temperature sensor, an atmospheric pressure sensor, a depth sensor, and a sound sensor (microphone), for example. The sensor 27 obtains information about a state of the PC 100 itself, such as an attitude of a housing of the PC 100, and information about a surrounding environment of the PC 100, such as brightness and noise around the PC 100, for example. Moreover, the sensor 27 may also include a GPS receiver that receives a global positioning system (GPS) signal to measure latitude, longitude, and altitude of the apparatus.

Each of the above-mentioned components may be configured using a general-purpose member or may be configured by hardware specialized in the function of each component. Such a configuration may be changed as appropriate in a manner that depends on the technical level at the time of implementation.

Functional Block Configuration of Video Projection System

Figure 3:
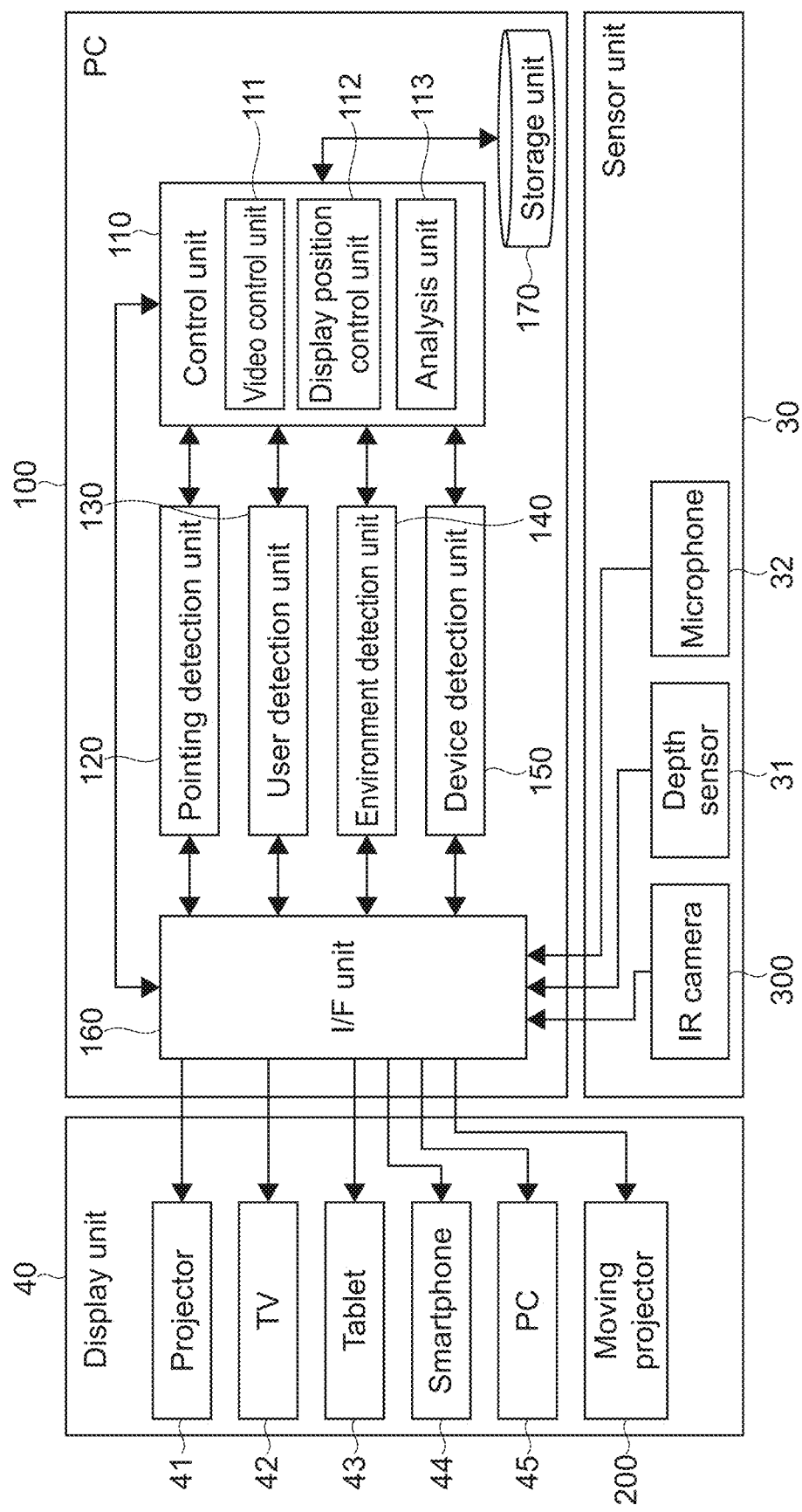
FIG. 3 A diagram showing configurations of functional blocks of the video projection system.

FIG. 3 is a diagram showing configurations of functional blocks (modules) included in the PC 100.

As shown in the figure, the PC 100 includes, as functional blocks, a control unit 110, a pointing detection unit 120, a user detection unit 130, an environment detection unit 140, a device detection unit 150, an interface unit 160, and a storage unit 170.

Examples of a sensor unit 30 that is an input source of sensor information for each of the function blocks to realize each function can include a depth sensor 31, a microphone 32, and the like in addition to the IR camera 300.

The control unit 110 includes a video control unit 111, a display position control unit 112, and an analysis unit 113.

The video control unit 111 controls projection processing of the video displayed in the projection region A.

The display position control unit 112 drives the moving projector 200 via the interface unit 160 to project the video to a pointing place of the user.

The analysis unit 113 analyzes various types of sensing data input from the sensor unit 30 via the interface unit 160. For example, the analysis unit 113 segments point cloud data (to be described later) interpreted on the basis of depth information from the depth sensor 31 and stores the segmented point cloud data classified into a wall surface, an object, and the like in the storage unit 170.

The user performs pointing through the pointing device 400 and the pointing detection unit 120 detects a bright spot imaged by the IR camera 300.

The user detection unit 130 detects the user's position in the space.

The environment detection unit 140 detects sensing information from various sensors as environment information. For example, the environment detection unit 140 detects the shape, irregularities, objects, and the like of the space by interpreting the depth information of the depth sensor 31 as the point cloud data. Moreover, the environment detection unit 140 also detects the color, illuminance, sound volume, and the like of the space.

The device detection unit 150 detects various devices existing in the space and their positions.

The interface unit 160 interfaces with a display unit 40, which is a display destination of information based on the functions executed by the sensor unit 30 and the respective functional blocks.

In addition to the moving projector 200, the display unit 40 includes a (non-driving) projector 41, a TV 42, a tablet PC 43, a smartphone 44, a PC 45 (different from the PC 100), and the like.

Preset Function of Projection Region

Next, a technique as a premise of the preset function of the projection region A will be described.

Figure 4:
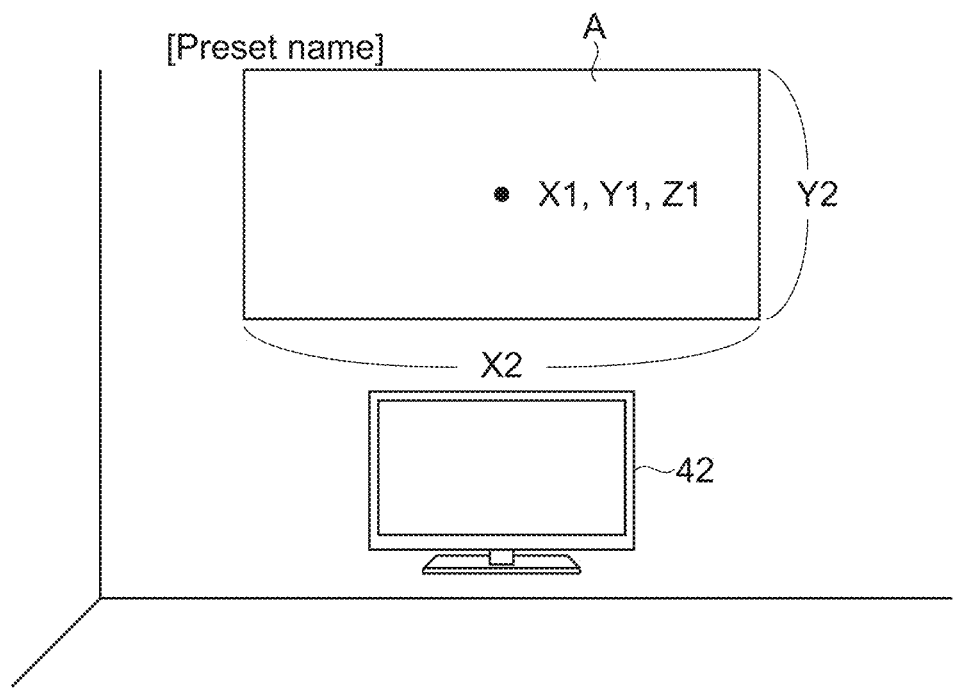
FIG. 4 A diagram showing a data format of setting information of a projection region preset in the video projection system.

The preset function is a function of registering in advance a place on which the user wishes to perform projection frequently in the real space. The PC 100 is capable of easily reproducing a projection environment on a call mode to be described later by setting and saving an exact position on which projection is performed in advance. An example of the preset information stored by the PC 100 is shown in FIG. 4.

As shown in the figure, the preset data includes information (preset name) for identifying a preset projection position, data about center coordinates (X1, Y1, Z1), and data about a projection size (X2, Y2) of the projection region A.

In a case where the projection place is preset by using the pointing device 400, the PC 100 may have a fine adjustment function because the pointing device 400 is not suitable for fine adjustment operations. There are two types of a manual setting by a keyboard and an automatic setting according to the real space for this. The details of each of them will be shown below.

First, the manual fine adjustment processing of the projection region A by the keyboard will be described. FIGS. 5A, 5B, and 5C are diagrams showing an adjustment procedure.

This function is a function for the user to perform fine adjustment in up, down, left, and right directions by using a d-pad in the keyboard of the PC 100 or the PC 45 after roughly designating a space through the pointing device 400. In a case where the pointing device 400 is provided with a d-pad, the d-pad of the pointing device 400 may be used instead of the d-pad of the PC 100 or the PC 45.

As shown in FIGS. 5A, 5B, and 5C, first, the user roughly designates a projected place through the pointing device 400 (FIG. 5A). In the example of the figure, the pointing position is located slightly obliquely above the TV 42.

Next, the user finely adjusts the place on which the user wishes to perform projection by using the d-pad in the keyboard of the PC 100 or the PC 45 (FIG. 5B). In FIGS. 5A, 5B, and 5C, the place on which the user wishes to perform projection is adjusted to a position lower right from that in the above FIG. 5A, along the upper edge of the TV 42.

Once the fine adjustment of the projection place is completed and the preset position is determined, the user gives a name to the preset place by inputting it through the keyboard of the PC 100 or the PC 45 or the like (FIG. 5C). In this manner, the manual setting of the preset position of the projection region A is completed.

Next, the automatic setting processing of the projection region A according to the real space will be described. In the automatic setting processing, ON/OFF of the function can be set on the basis of the user's input, for example.

The PC 100 recognizes the shape of the space in advance by analyzing various types of sensing data of the sensor unit 30 as described above. It is because the PC 100 needs to understand, in a spatial coordinate system, to which object in the space the bright spot of the pointing device 400 observed by the IR camera 300 is reflected.

Figure 6:
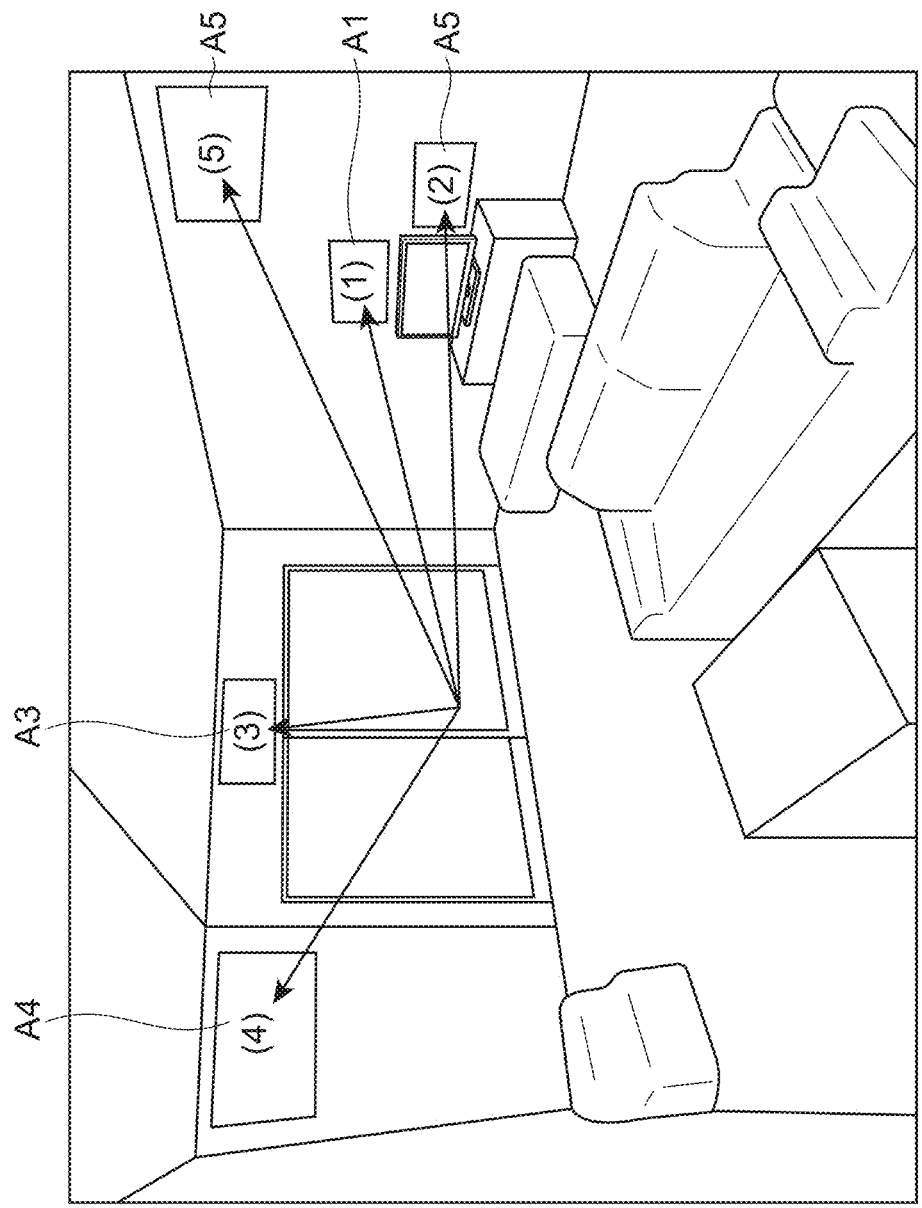
FIG. 6 A diagram showing an example of presetting the projection region in the video projection system.

Using this three-dimensional information, the PC 100 arranges the projection region A in accordance with the edge of the object in a case where there is an object in the vicinity in a place roughly designated by the user through the pointing device 400, and arranges the projection region A in the most suitable region in a case where there is nothing in the vicinity. Each projection region set in the space will be described with reference to FIG. 6.

A projection region A1 is adjusted to a place along the upper edge of the TV on the basis of a rough pointing operation to the vicinity above the TV.

A projection region A2 is adjusted to a place along the right side of the TV and the top surface of the TV rack on the basis of a rough pointing operation to the vicinity of the right-hand side of the TV.

A projection region A3 is adjusted to a place along the top edge of the window on the basis of a rough pointing operation to the vicinity of the top of the window.

Projection regions A4 and A5 are arranged, centered at the pointed place because there are no objects at the place on which the pointing operation is performed.

Figure 7A:
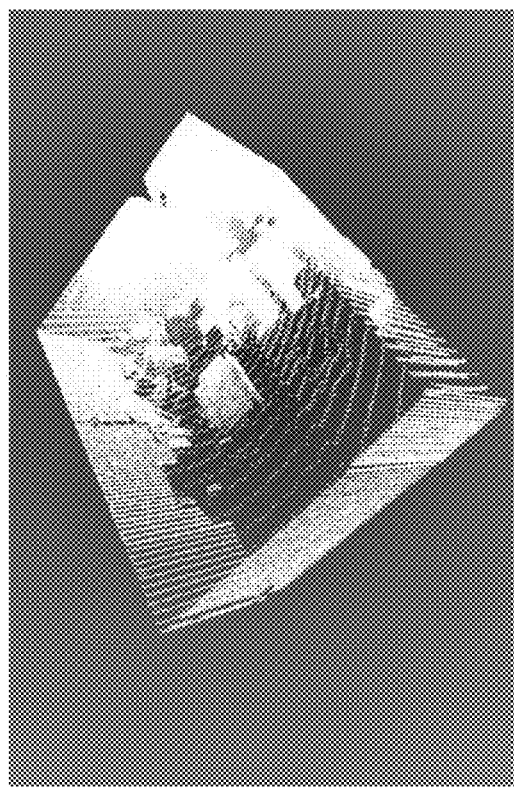
FIGS. 7A and 7B Diagrams showing point cloud data when a three-dimensional shape in the space is observed in the video projection system.
Figure 7B:
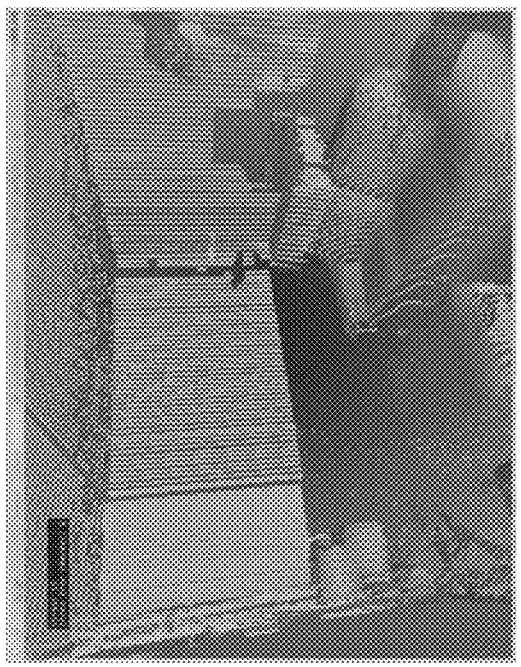

The PC 100 calculates an automatic adjustment position according to the environment of the space by using the three-dimensional shape used in the pointing processing. FIGS. 7A and 7B are diagrams showing point cloud data when a three-dimensional shape is observed. FIG. 7A shows data of the space in an overhead view and FIG. 7B shows data of the space as viewed from the side.

By segmenting the point cloud data, the PC 100 is capable of recognizing boundaries of objects such as the TV and a window.

The preset processing of the projection region A as described above is performed on the preset mode, and on the call mode, the preset projection region A is called and video is projected thereon.

Operation of Video Projection System

Next, an operation of the video projection system configured as described above will be described. The operation is performed in cooperation of hardware such as the CPU 11 and a communication unit of the PC 100 with software stored in the ROM 12, the RAM 13, the storage device 20, or the removable recording medium 24. Hereinafter, the description will be given assuming that the CPU 11 primarily performs the operation for the sake of convenience.

Figure 8:
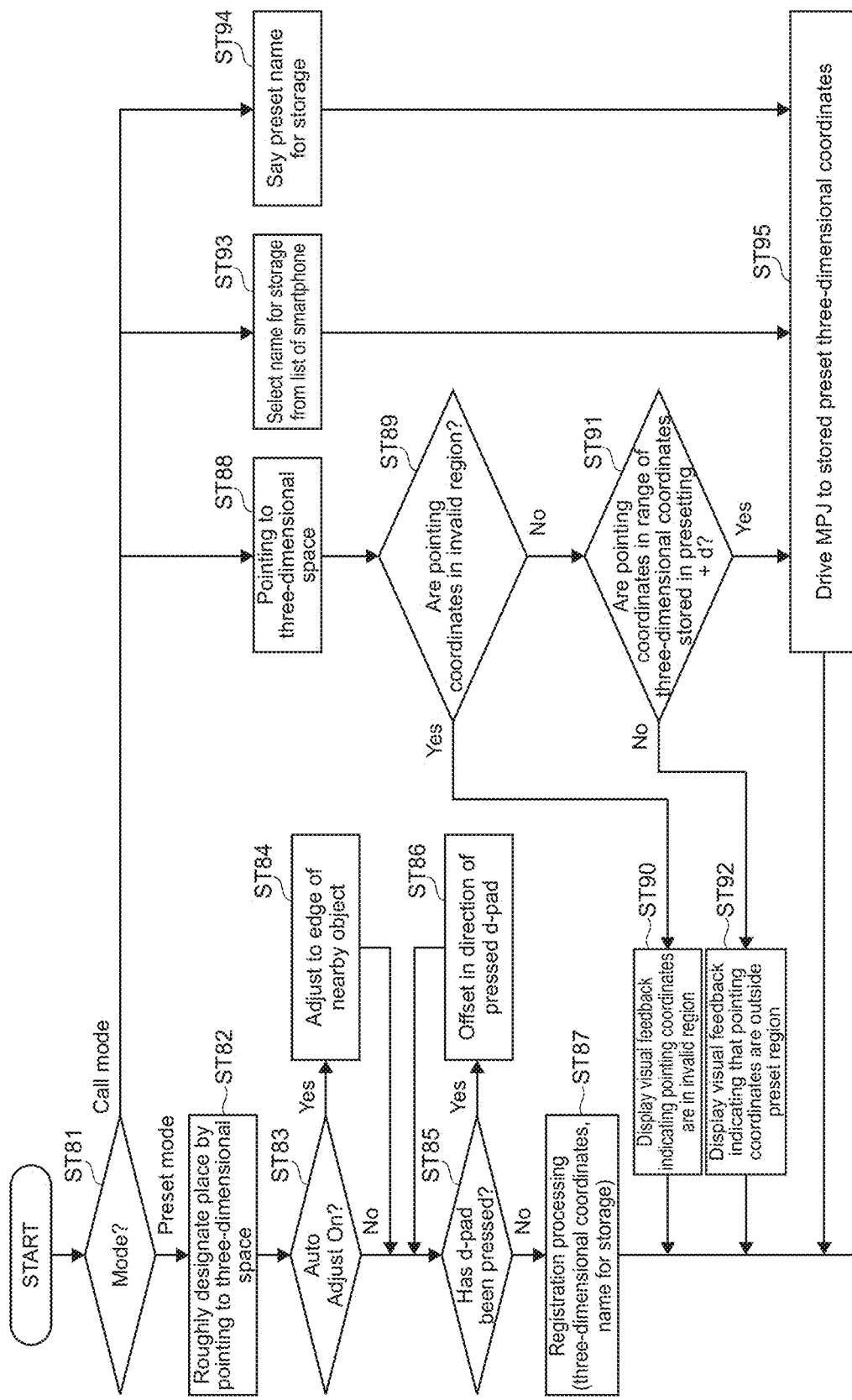
FIG. 8 A flowchart showing a flow of projection region presetting processing and projection processing by the video projection system.

FIG. 8 is a flowchart showing a flow of the projection region preset processing and the projection processing by the video projection system. As preprocessing of the processing, the CPU 11 performs initial setting processing.

That is, the CPU 11 obtains the depth information of the set space through the depth sensor 31 of the sensor unit 30, interprets the obtained data as the point cloud data (FIGS. 7A and 7B) through the environment detection unit 140, segments the point cloud data through the analysis unit 113, and stores the segmented point cloud data classified into a wall surface, an object, and the like in the storage unit 170.

Through the initial settings described above, the CPU 11 determines which one of the preset mode or the call mode the CPU 11 has been instructed to perform as shown in the figure (Step 81).

The preset mode and the call mode may be switched by the user via a menu screen displayed by the PC 100 or may be switched by the PC 100 detecting an operation to a switch or the like provided in the pointing device 400.

In a case where it is determined that the current mode is the preset mode, the CPU 11 detects rough place designation by the user's pointing operation in a three-dimensional space (Step 82).

That is, in a case where the user uses the pointing device 400 to point at a projection place that the user wishes to register, the IR camera 300 of the sensor unit 30 images a bright spot and the CPU 11 detects the bright spot through the pointing detection unit 120.

Then, the CPU 11 reads out the pre-stored point cloud data from the storage unit 170 and determines a three-dimensional coordinate point of the coordinate at which the bright spot has been detected. Subsequently, the CPU 11 drives the moving projector 200 via the I/F unit 160 by the display position control unit 112 to project video to the pointing place.

Next, the CPU 11 determines whether or not the automatic adjustment function is turned on (Step 83).

Figure 9:
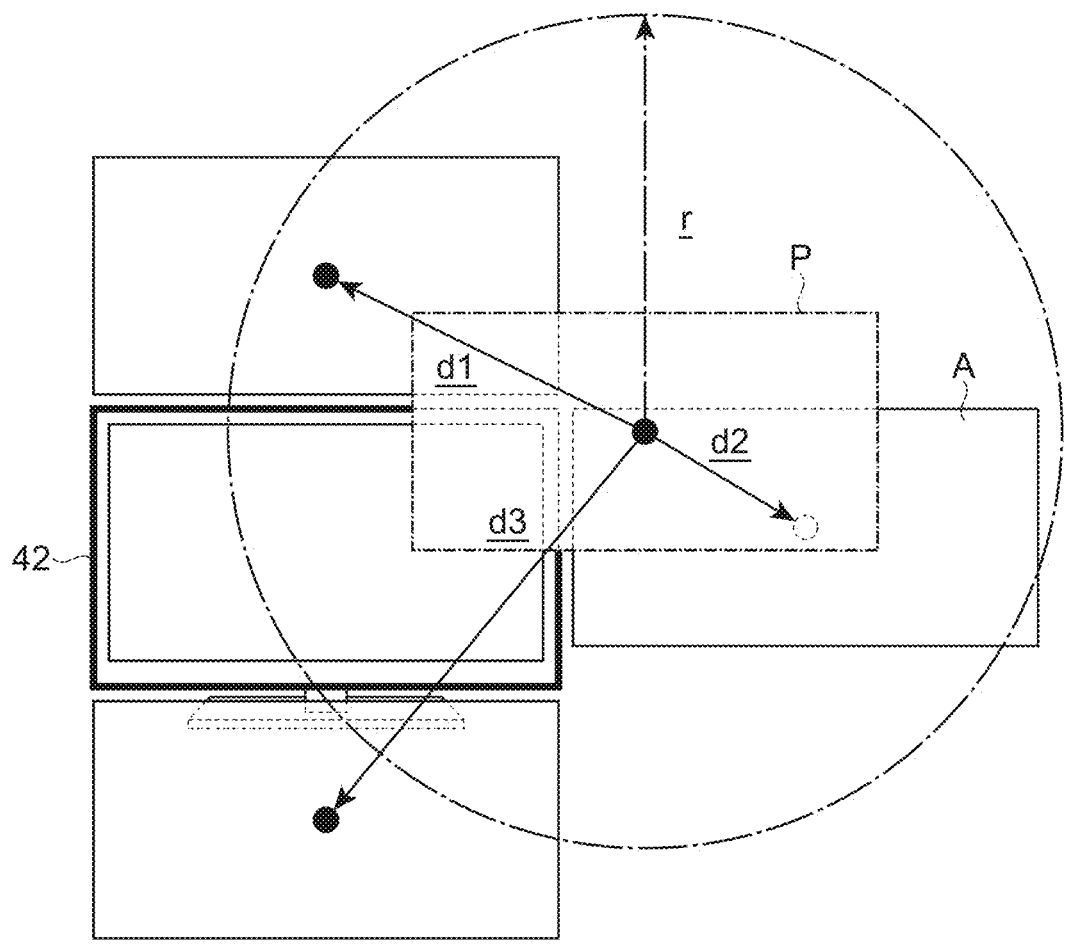
FIG. 9 A diagram showing an algorithm of automatic adjustment processing in the video system.

In a case where it is determined that the automatic adjustment function is turned on (Yes), the CPU 11 adjusts the position of the projection region in accordance with the edges of the object interpreted on the basis of the point cloud data (Step 84). FIG. 9 is a diagram showing an algorithm of this automatic adjustment processing.

In the figure, the rectangle drawn by the dashed-dotted line indicates a region P designated by the pointing device 400.

The CPU 11 detects an edge at a distance that is a radius r from the center of this pointing region P. In the figure, three upper, right, and lower sides of the TV 42 correspond to such edges. Here, distances in a case of adjusting the projection region A along the respective edges are denoted by d1, d2, and d3, respectively. The CPU 11 sets a place with the smallest distance as the adjustment place of the projection region A. In the figure, since d3>d1>d2, the projection region A is adjusted to the right side of the TV 42.

In a case where it is determined in Step 83 that the automatic adjustment function is turned off (No) and in a case where the automatic adjustment processing is terminated, the CPU 11 determines whether or not an up/down/left/right press operation has been made through the d-pad as the user's fine adjustment (Step 85).

In a case where it is determined that the d-pad has been pressed (Yes), the CPU 11 offsets the projection region A in the direction in which the d-pad has been pressed (Step 86).

In a case where it is determined that the press operation on the d-pad has not been made for a predetermined time or more, for example (No), the CPU 11 presets (registers) three-dimensional coordinates of the position of the current projection region A in the storage unit 170 in association with a name for storage input by the user (Step 87). Here, although regarding the area of the projection region A, the projection regions are all set to rectangles each having a predetermined-size, the size may be varied in a manner that depends on the presence or absence of an object in vicinity of the pointing coordinates.

In Step 81, in a case where it is determined that the current mode is the call mode, the CPU 11 determines by which method the call has been instructed.

Figure 13:
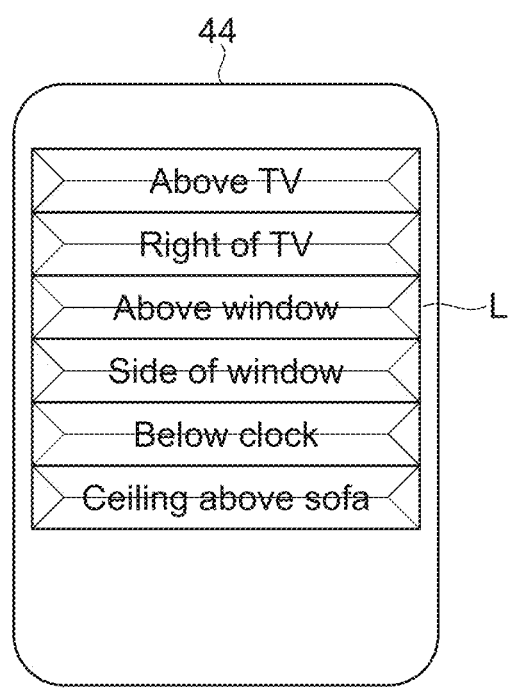
FIG. 13 A diagram showing an example of a GUI for selecting a projection region preset in the video system on the basis of a preset name.

That is, there are three methods for calling the projection region A in the preset space as follows. 1) Method of designating by pointing using the pointing device 400 used by the user for presetting 2) Method of selecting from a registered preset name list through a GUI displayed on the smartphone 44 (see a registered preset name list L in FIG. 13)

3) Method of selecting by saying the preset name using a voice input function of the smartphone 44 or a smart speaker (not shown)

In a case where it is determined that the call has been performed by the pointing operation (Step 88), the CPU 11 determines whether or not the pointing coordinates are in an invalid region (Step 89).

Now, a case where the PC 100 determines that the pointing coordinates are valid and a case where the PC 100 determines that the pointing coordinates are invalid will be described.

Figure 10:
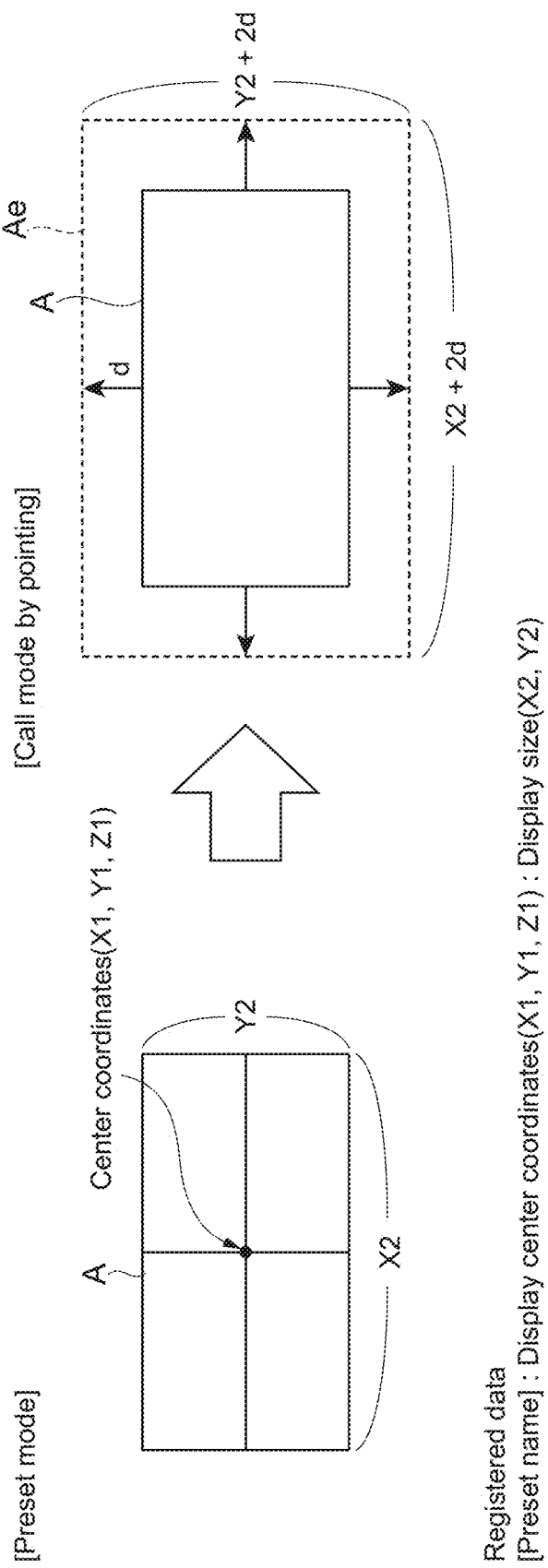
FIG. 10 A diagram showing expansion processing of a pointing determination region in the video system.

On the call mode, the PC 100 handles a expansion region obtained by expanding the projection region A centered on the three-dimensional coordinates stored on the preset mode in the up, down, left, and right directions as a validity determination region of the pointing operation (region designated by the pointing operation). FIG. 10 is a diagram showing expansion processing of the pointing validity determination region.

The left-hand side of the figure shows the center coordinates and the display size of the projection region A stored on the preset mode. On the basis of this, the CPU 11 uses an expansion region Ae obtained by expanding the projection region A by a distance d as the pointing validity determination region as shown on the right-hand side of the figure.

Although d may be a fixed value, the CPU 11 may obtain the distance between the user and a projection surface from the sensor unit 30 and vary d in accordance with the distance. For example, since the pointing accuracy decreases as the operation distance increases, the CPU 11 increases the value of d to expand the validity determination region. Accordingly, the user can intuitively and easily designate the projection region A without exactly adjusting the pointing position.

Moreover, on the preset mode, an overlap region is not generated between the plurality of projection regions A while the expansion regions can overlap each other due to the above-mentioned expansion processing in a case where the plurality of projection regions A are present at relatively close positions.

Figure 11:
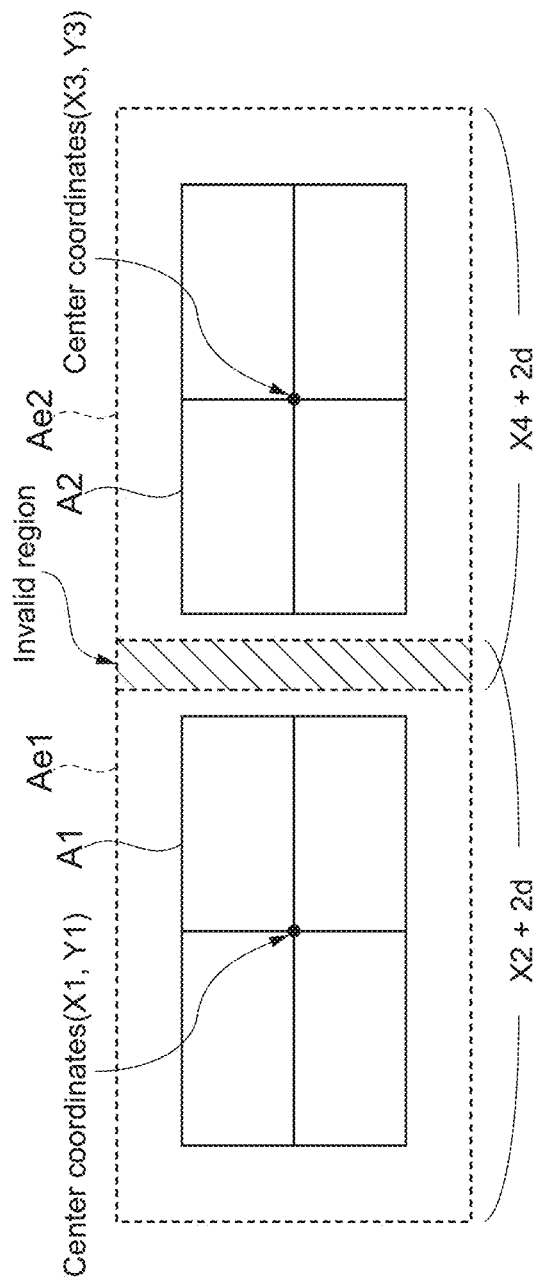
FIG. 11 A diagram showing calculation processing of a pointing invalid region in the video system.

Therefore, the CPU 11 handles a pointing operation for such an overlap region as an invalid operation. FIG. 11 is a diagram showing calculation processing of the pointing invalid region. In the example of the figure, only an X component is used for calculation for the sake of simplification.

As shown in the figure, the CPU 11 calculates an overlap region between two expansion regions Ae1 and Ae2 in accordance with the calculation formula at the bottom of the figure and sets the overlap region as the invalid region of the pointing operation.

That is, when the CPU 11 determines that the sum of the distances from the center coordinates of the two expansion regions to the left and right ends is larger than the distance between the two expansion regions, the CPU 11 determines that the two expansion regions overlap each other.

Then, the CPU 11 calculates a width of the overlap region and determines boundary coordinates between the two expansion regions Ae1 and Ae2 by considering the width. Accordingly, the overlap region is set as the invalid region of the pointing operation.

Accordingly, it is prevented that it is impossible to determine which of the plurality of projection regions A set at close positions has been designated by the user.

Referring back to FIG. 8, in a case where the CPU 11 determines that the pointing coordinates are within the invalid region (Yes in Step 89), the CPU 11 causes the user to project a visual feedback indicating that the pointing position is in the invalid region onto the moving projector 200 at the pointing position, for example (Step 90).

Moreover, in a case where the CPU 11 determines that the pointing coordinates are not in the invalid region but is outside the range of the expansion region Ae (region obtained by expanding the projection region A centered on the three-dimensional coordinates stored by the presetting by d) (No in Step 91), the CPU 11 causes the user to project a visual feedback indicating that the pointing position is outside the projection region A onto the moving projector 200 at the pointing position, for example (Step 92).

FIGS. 12A, 12B, 12C, 12D, 12E, 12F, 12G, and 12H are diagrams showing an example of such a visual feedback to the user.

Figure 12A:
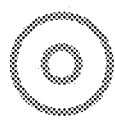
FIGS. 12A, 12B, 12C, 12D, 12E, 12F, 12G, and 12H Diagrams showing a visual feedback example to a user in a case where a region outside the determination region is pointed in the video system.

As shown in FIG. 12A, the CPU 11 may output an image in which ripples spread out around the pointing position.

Figure 12B:
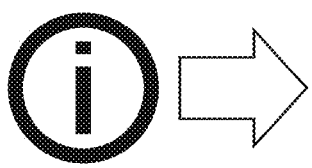

As shown in FIG. 12B, the CPU 11 may output a symbol such as an information mark and an x mark to the pointing position, for example, and may output an arrow image in a preset setting direction of a nearby projection region A.

Figure 12C:
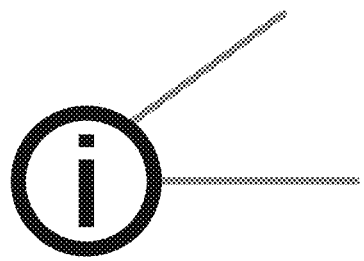

As shown in FIG. 12C, the CPU 11 may output a symbol such as an information mark or an x mark to the pointing position, for example, and may output an image in which two straight lines gradually extend in the preset setting direction of the nearby projection region A.

Figure 12D:
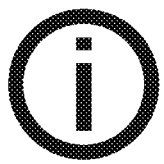

As shown in FIG. 12D, the CPU 11 may output only a symbol such as an information mark or an x mark to the pointing position, for example.

Figure 12E:
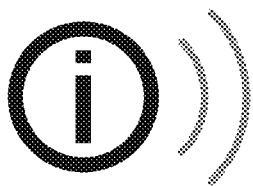

As shown in FIG. 12E, the CPU 11 may output a symbol such as an information mark or an x mark to the pointing position, for example, and output an image of ripples in the preset setting direction of the nearby projection region A.

Figure 12F:
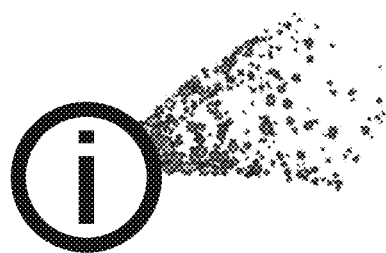

As shown in FIG. 12F, the CPU 11 may output a symbol such as an information mark and an x mark to the pointing position, for example, and output a particle image in the preset setting direction of the nearby projection region A.

Figure 12G:

As shown in FIG. 12G, the CPU 11 may output an icon indicating that the pointing operation is invalid (x mark on the image pointed) to the pointing position.

Figure 12H:
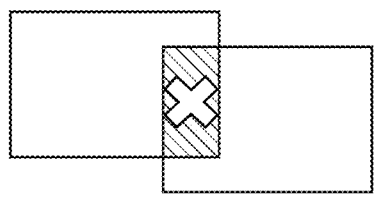

As shown in FIG. 12H, the CPU 11 may output an image indicating that an invalid region overlapping between a plurality of preset projection regions has been pointed (such as an image showing an x mark in the overlap region between two regions).

In addition to these, the CPU 11 may output a different visual feedback image in a manner that depends on whether the pointing operation is a pointing operation into the above-mentioned invalid region I or a pointing operation outward from the expansion region Ae.

With such visual feedback, the PC 100 is capable of making the user know that the pointing operation is invalid and prompting the user to perform a pointing operation again to another position in order to designate the projection region.

The feedback information may be output as audio information from an external speaker such as the PC 100 or the smart speaker instead of being output from the moving projector 200 as image information.

In a case where the CPU 11 determines that the pointing coordinates are within the expansion region Ae (Yes in Step 91), the CPU 11 drives the moving projector 200 to project video onto the preset projection region A corresponding to the pointing coordinates (Step 95).

Moreover, also in a case where not only the pointing operation by the pointing device 400 but also a selection operation of the projection region A from the registered preset name list L displayed on the smartphone 44 or a selection operation of the projection region A by voice input of the registered preset name are input (Steps 93 and 94), the CPU 11 drives the moving projector 200 to project the video in the preset projection region A corresponding to the selection (Step 95).

As described above, in accordance with this embodiment, it is possible to preset the projection region A at various positions desired by the user on the basis of the pointing operation of the user and to easily project video onto the projection region A.

Modified Examples

The present invention is not limited only to the above-mentioned embodiment and can be variously modified without departing from the gist of the present invention.

Although the size of the projection region A to be preset is fixed on the preset mode of the above-mentioned embodiment, the CPU 11 may change the area of the projection region A to be preset in accordance with the area of the plane including the pointing coordinates through the pointing device 400. For example, the CPU 11 may set the area of the display region having a predetermined aspect ratio to the maximum area that does not overlap the object existing around the pointing coordinates.

On the preset mode of the above-mentioned embodiment, the CPU 11 may vary the area and shape of the projection region A to be preset in accordance with content to be projected. For example, in a case where it is detected that an application for presenting square photographs in a slide show has been activated, the projection region A may be set to be square, not to be rectangular. Alternatively, the CPU 11 may cause the user to select an application for outputting the content to be projected for each presetting of the projection region A and set the area and shape of the projection region A in accordance with the selection.

On the preset mode of the above-mentioned embodiment, the position of the projection region A is adjusted along the edge of the object in vicinity of the pointing position of the user. However, in a case where the CPU 11 determines that the surface in vicinity of the pointing coordinates are inappropriate for projection by analyzing the sensor information, information (image or audio) for prompting to perform a pointing operation again for other coordinates excluding those coordinates may be output from the moving projector 200, the PC 100, or the like.

Here, the surface inappropriate for projection includes not only a case where the pointing surface is not flat, but also a case where the surface has a material (e.g., glass or the like), color, and illuminance inappropriate for projection. In this case, for plane recognition, the CPU 11 may use an ultrasonic sensor and a captured image in addition to the depth sensor. Moreover, as to whether the surface has material, color, and illuminance inappropriate for projection, an optical sensor, a captured image, an illuminance sensor, and the like may be used.

Although the CPU 11 determines that the overlap region between the expansion regions Ae of the plurality of preset projection regions A is the invalid region on the call mode of the above-mentioned embodiment, the expansion region Ae may be expanded (that is, the expansion region Ae may be moved outward) by the area of the invalid region, for example, on the opposite side of each expansion region Ae forming the invalid region.

The CPU 11 may allow the user to select which of the projection regions A to be designated without setting the overlap region as the invalid region when calculating the overlap region.

Although in the embodiment described above, the PC 100 and the moving projector 200 are described as separate apparatuses, both devices may be integrally configured.

Others

The present technology can also take the following configurations.

(1) An information processing apparatus, including:
an input unit to which sensing information and coordinate information are input, the sensing information being obtained by sensing a space in which video is projected, the coordinate information being obtained by pointing through a pointing operation of the space by a user; and
a control unit that
stores setting information for setting a projection region in a predetermined range in a storage unit on the basis of a result of analyzing a state in the space on the basis of the sensing information and the coordinate information and
controls, in a case where a projection region is designated by the user on the basis of the stored setting information, a projection apparatus to project the video onto the projection region.

(2) The information processing apparatus according to (1), in which
the control unit sets the projection region to be centered on coordinates changed from coordinates indicated by the coordinate information on the basis of the result of analyzing.

(3) The information processing apparatus according to (2), in which
the control unit sets the projection region along an edge of an object recognized in vicinity of the coordinates indicated by the coordinate information.

(4) The information processing apparatus according to (3), in which
the control unit sets, in a case where a plurality of edges is detected within a distance that is a predetermined radius from the coordinates indicated by the coordinate information, the projection region along one of the edges that minimizes a movement distance when the coordinates are moved along the edge.

(5) The information processing apparatus according to (2), in which
the control unit changes an area of the projection region set in accordance with an area of a plane including the coordinates indicated by the coordinate information.

(6) The information processing apparatus according to (1) to (5), in which
the control unit outputs, in a case of determining that a surface in vicinity of the coordinates indicated by the coordinate information is inappropriate for projection by the analysis, information for prompting to perform the pointing operation on coordinates different from the coordinates anew.

(7) The information processing apparatus according to (1) to (6), in which
the control unit determines that the projection region is designated in a case where the pointing operation by the user is received in an extended region including the set projection region and extended to be larger than the projection region.

(8) The information processing apparatus according to (7), in which
the control unit handles, in a case where an overlap region between the extended regions of the plurality of projection regions set is present, the pointing operation with respect to the overlap region as an invalid operation.

(9) The information processing apparatus according to (8), in which
the control unit outputs, in a case where the pointing operation is detected outside the extended region or inside the overlap region, feedback information for providing a feedback indicating that that the pointing operation is invalid to the user.

(10) The information processing apparatus according to (1) to (9), in which
the control unit
stores the setting information together with identification information for identifying the projection region and
determines that a projection region corresponding to the identification information is designated when an operation or voice to select the identification information is input from the user.

(11) An information processing method, including:
receiving input of sensing information and coordinate information, the sensing information being obtained by sensing a space in which video is projected, the coordinate information being obtained by pointing through a pointing operation of the space by a user;
storing setting information for setting a projection region in a predetermined range on the basis of a result of analyzing a state in the space on the basis of the sensing information and the coordinate information; and
controlling, in a case where a projection region is designated by the user on the basis of the stored setting information, a projection apparatus to project the video onto the projection region.

(12) A program that causes an information processing apparatus to execute the steps of:
receiving input of sensing information and coordinate information, the sensing information being obtained by sensing a space in which video is projected, the coordinate information being obtained by pointing through a pointing operation of the space by a user;
storing setting information for setting a projection region in a predetermined range on the basis of a result of analyzing a state in the space on the basis of the sensing information and the coordinate information; and
controlling, in a case where a projection region is designated by the user on the basis of the stored setting information, a projection apparatus to project the video onto the projection region.

REFERENCE SIGNS LIST

11 CPU
18 input apparatus
19 output apparatus
20 storage apparatus
26 imaging device
23 communication apparatus
100 PC
200 moving projector
400 pointing device
A projection region

The invention claimed is:
1. An information processing apparatus, comprising:
circuitry configured to:
  receive sensing information and coordinate information as input, wherein
    the sensing information is obtained by sensing a space in which video is projected, and
    the coordinate information is obtained by pointing through a pointing operation of the space by a user;
  store setting information for setting a projection region in a specific range in a storage unit based on a result of analyzing a state in the space, wherein the result is analyzed based on the sensing information and the coordinate information;
  control, based on designation of the projection region by the user, a projection apparatus to project the video onto the projection region, wherein the projection region is designated by the user based on the stored setting information;
  determine that the projection region is designated, based on reception of the pointing operation by the user in an extended region including the set projection region and which is extended to be larger than the projection region; and
  handle, based on presence of an overlap region between the extended regions of a plurality of projection regions, the pointing operation with respect to the overlap region as an invalid operation.

2. The information processing apparatus according to claim 1, wherein the circuitry is further configured to set the projection region, based on the result of analysis, to be centered on first coordinates indicated by the coordinate information.

3. The information processing apparatus according to claim 2, wherein the circuitry is further configured to set the projection region along a specific edge of a plurality of edges of an object recognized in vicinity of second coordinates indicated by the coordinate information.

4. The information processing apparatus according to claim 3, wherein
the circuitry is further configured to set, based on detection of the plurality of edges within a distance that is a specific radius from the second coordinates indicated by the coordinate information, the projection region along the specific edge of the plurality of edges, and
the specific edge minimizes a movement distance when the second coordinates are moved along the plurality of edges.

5. The information processing apparatus according to claim 3, wherein the circuitry is further configured to change an area of the projection region set in accordance with an area of a plane including the second coordinates indicated by the coordinate information.

6. The information processing apparatus according to claim 1, wherein the circuitry is further configured to output, based on detection of the pointing operation as one of outside the extended region or inside the overlap region, feedback information for providing a feedback indicating that the pointing operation is invalid to the user.

7. The information processing apparatus according to claim 1, wherein the circuitry is further configured to:
store the setting information together with identification information for identifying the projection region; and
determine that a projection region corresponding to the identification information is designated when at least one of an operation or voice to select the identification information is input from the user.

8. An information processing method, comprising:
receiving input of sensing information and coordinate information, wherein
  the sensing information is obtained by sensing a space in which video is projected, and
  the coordinate information is obtained by pointing through a pointing operation of the space by a user;
storing setting information for setting a projection region in a specific range based on a result of analyzing a state in the space, wherein the result is analyzed based on the sensing information and the coordinate information;
controlling, based on designation of the projection region by the user, a projection apparatus to project the video onto the projection region, wherein the projection region is designated by the user based on the stored setting information;
determining that the projection region is designated, based on reception of the pointing operation by the user in an extended region including the set projection region and which is extended to be larger than the projection region; and
handling, based on presence of an overlap region between the extended regions of a plurality of projection regions, the pointing operation with respect to the overlap region as an invalid operation.

9. A non-transitory computer-readable medium having stored thereon, computer-executable instructions which, when executed by a computer, cause the computer to execute operations, the operations comprising:
receiving input of sensing information and coordinate information, wherein
the sensing information is obtained by sensing a space in which video is projected, and
the coordinate information is obtained by pointing through a pointing operation of the space by a user;
storing setting information for setting a projection region in a specific range based on a result of analyzing a state in the space, wherein the result is analyzed based on the sensing information and the coordinate information;
controlling, based on designation of the projection region by the user, a projection apparatus to project the video onto the projection region, wherein the projection region is designated by the user based on the stored setting information;
determining that the projection region is designated, based on reception of the pointing operation by the user in an extended region including the set projection region and which is extended to be larger than the projection region; and
handling, based on presence of an overlap region between the extended regions of a plurality of projection regions, the pointing operation with respect to the overlap region as an invalid operation.

10. The information processing apparatus according to claim 3, wherein the circuitry is further configured to output, based on a determination that a surface in vicinity of the second coordinates indicated by the coordinate information is unsuitable for projection based on the analysis, information to execute the pointing operation on the first coordinates, wherein the first coordinates are different from the second coordinates.

* * * * *